(12) United States Patent
Hirsch

(10) Patent No.: US 8,675,544 B1
(45) Date of Patent: Mar. 18, 2014

(54) METHOD AND SYSTEM FOR DUAL PHYSICAL LAYER RADIO TRANSMISSION

(75) Inventor: Olaf Hirsch, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 12/212,597

(22) Filed: Sep. 17, 2008

(51) Int. Cl.
*H04B 7/212* (2006.01)

(52) U.S. Cl.
USPC ........... 370/322; 370/337; 370/348; 370/443; 370/447; 370/458; 370/462

(58) Field of Classification Search
USPC .......... 370/314, 321, 322, 336, 337, 347, 348
See application file for complete search history.

(56) References Cited

U.S. PATENT DOCUMENTS

| | | | |
|---|---|---|---|
| 6,895,255 B1 * | 5/2005 | Bridgelall | 455/552.1 |
| 2001/0010689 A1 * | 8/2001 | Awater et al. | 370/344 |
| 2005/0125713 A1 * | 6/2005 | Roh et al. | 714/748 |
| 2007/0281617 A1 * | 12/2007 | Meylan et al. | 455/41.2 |
| 2008/0117850 A1 * | 5/2008 | Agrawal et al. | 370/311 |

* cited by examiner

*Primary Examiner* — Alvin Zhu
(74) *Attorney, Agent, or Firm* — Bever, Hoffman & Harms, LLP

(57) ABSTRACT

A wireless communication device may contain a plurality of physical layer radios that communicate using a set of communication protocols. In a first wireless communication device, the transmissions by a first physical layer radio using a first communication protocol may be divided into a series of time slots. Some of the time slots may be partially unoccupied allowing negotiation and use of a second communication protocol during the unoccupied portion of the time slot and succeeding time slots.

25 Claims, 4 Drawing Sheets

METHOD AND SYSTEM FOR DUAL PHYSICAL LAYER RADIO TRANSMISSION

BACKGROUND OF THE INVENTION

1. Field of the Invention

Embodiments of the present invention generally relate to wireless communication systems, and more particularly to wireless personal area networking and wireless local area networking.

2. Description of the Related Art

Wireless communication systems transfer data from a transmitting station to one or more receiving stations using modulated radio frequency (RF) signals. Bluetooth™ systems are wireless communication systems governed, in part, by the Bluetooth™ Special Interest Group (SIG) which publishes specifications and compliance standards. The current Bluetooth™ standards, up to version 2.1, are designed for low power consumption, short range communication at rates of 1 to 3 Mbps. The next generation of Bluetooth™ standards, still in development, proposes using radio transmission methods capable of significantly higher data rates. To maintain the low power methods of current Bluetooth™ standards, an alternative physical layer radio may be used for high rate data transmission when required, while the low power Bluetooth™ radio may be used otherwise. The IEEE 802.11 wireless local area networking standards provide exemplary higher data rate transmission methods using the same radio frequency band as Bluetooth™ standards, and the Bluetooth™ SIG has proposed adopting some of the IEEE 802.11 wireless standards as alternate physical layers for the next generation Bluetooth™ standard.

Both the Bluetooth™ and IEEE 802.11 wireless standards use the unlicensed industrial scientific medical (ISM) frequency band from 2.4 GHz to 2.4835 GHz including guard bands at the upper and lower boundaries. Bluetooth™ physical layer radio channels may frequency hop among a set of 79 different 1 MHz wide radio frequency channels, while an IEEE 802.11 physical layer radio channel may occupy a 20 MHz or 40 MHz contiguous frequency band. A first set of devices using Bluetooth™ standards and a second set of devices using an IEEE 802.11 wireless standard within the same physical range may likely interfere with one another. Some prior art has focused on applying time division multiplexing and frequency division multiplexing techniques to the different sets of devices to mitigate interference in a wireless network using both standards. Increasingly, however, portable electronic devices such as laptop computers, personal digital assistants and cellular telephones may incorporate hardware to support multiple wireless standards in the same device, with multiple standards to be used simultaneously.

A set of Bluetooth™ devices that form a piconet may communicate by frequency hopping in a pseudo-random manner among a set of 79 different frequencies in the ISM band. Several of these frequencies may overlap with a frequency band used by a collocated IEEE 802.11 wireless local area network (WLAN). The Bluetooth™ standard specifies an adaptive frequency hopping technique that may minimize the frequency overlap and thereby the interference between the Bluetooth™ piconet devices and the IEEE 802.11 WLAN devices; however, a Bluetooth™ transceiver and an IEEE 802.11 WLAN transceiver collocated in the same device may still interfere with one another. For example the transmit spectrum of an IEEE 802.11 WLAN transmitter may be relatively strong measured at a collocated Bluetooth™ receiver so as to mask the presence of a relatively weak Bluetooth™ receive spectrum even if the spectra do not directly overlap. Smaller portable devices may place an IEEE 802.11 WLAN transmitter and a Bluetooth™ receiver relatively close together physically and may exhibit such interference. A system using non-overlapping but interfering spectra may still use time division techniques to minimize interference.

FIG. 1 illustrates a prior art dual protocol Bluetooth™/802.11 device 100 that may communicate with a Bluetooth™ device 110, thereby forming a Bluetooth™ personal area network (PAN) 130, as well as an IEEE 802.11 device 120, thereby forming an IEEE 802.11 local area network (LAN) 140. Bluetooth™ and IEEE 802.11 higher layers may communicate with each other in the Bluetooth™/802.11 device 100 to reduce interference; however, a Bluetooth™ protocol stack may be restricted to using the lower rate Bluetooth™ physical layer radio to communicate with the Bluetooth™ device 110, even though the Bluetooth™/802.11 device 100 also contains a higher rate IEEE 802.11 physical layer radio.

FIG. 2 illustrates a dual physical layer Bluetooth™ device 200, where, as proposed for the next generation Bluetooth™ standard, a device may use both a Bluetooth™ physical layer radio and an IEEE 802.11 physical layer radio to enable a higher data rate Bluetooth™ connection. The Bluetooth™ physical layer radio may be used for lower speed operations, such as device discovery, initial connection, profile configuration, and low speed data transfer. The IEEE 802.11 physical layer radio may be used selectively for higher speed data transfer. If the dual physical layer Bluetooth™ device 200 is a master device that controls the data flow in a Bluetooth™ network and the Bluetooth™ device 210 is a slave device, then the dual radio Bluetooth™ master device 200 can alternate between using a Bluetooth™ physical layer radio and an IEEE 802.11 physical layer radio as required; however, the dual radio Bluetooth™ slave device 210 cannot initiate use of its IEEE 802.11 physical layer radio according to currently proposed Bluetooth™ standards.

Thus, there exists a need for a multiple radio transmission method within the same device that may provide an efficient, shared use of the same frequency band, overlapping frequency bands or adjacent frequency bands within a wireless communication system.

SUMMARY OF THE INVENTION

A wireless communication device may contain a plurality of physical layer radios that communicate using a set of communication protocols. In a first wireless communication device, the transmissions by a first physical layer radio using a first communication protocol may be divided into a series of time slots. Some of the time slots may be partially unoccupied allowing negotiation and use of a second communication protocol during the unoccupied portion of the time slot and succeeding time slots.

DETAILED DESCRIPTION

Figure 1:
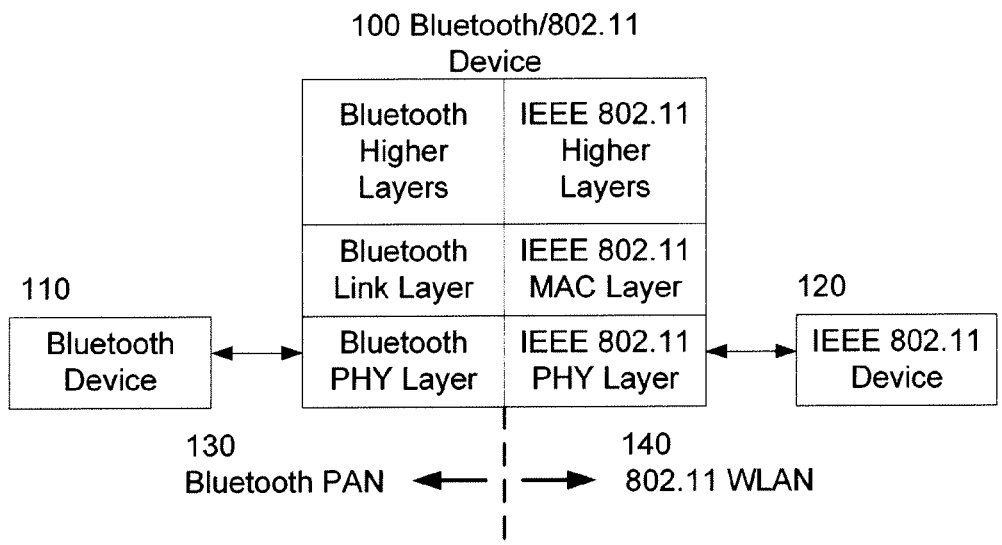
FIG. 1 illustrates a dual protocol Bluetooth™/802.11 device forming a Bluetooth™ personal area network and a separate IEEE 802.11 local area network.
Figure 2:
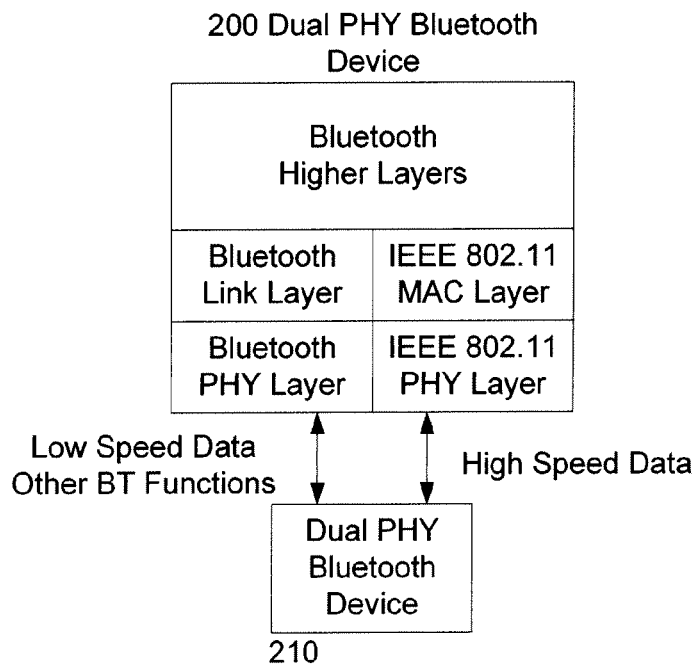
FIG. 2 illustrates a pair of dual physical layer Bluetooth™ devices connected forming a Bluetooth™ personal area network capable of both low and high data rate transmission.
Figure 3:
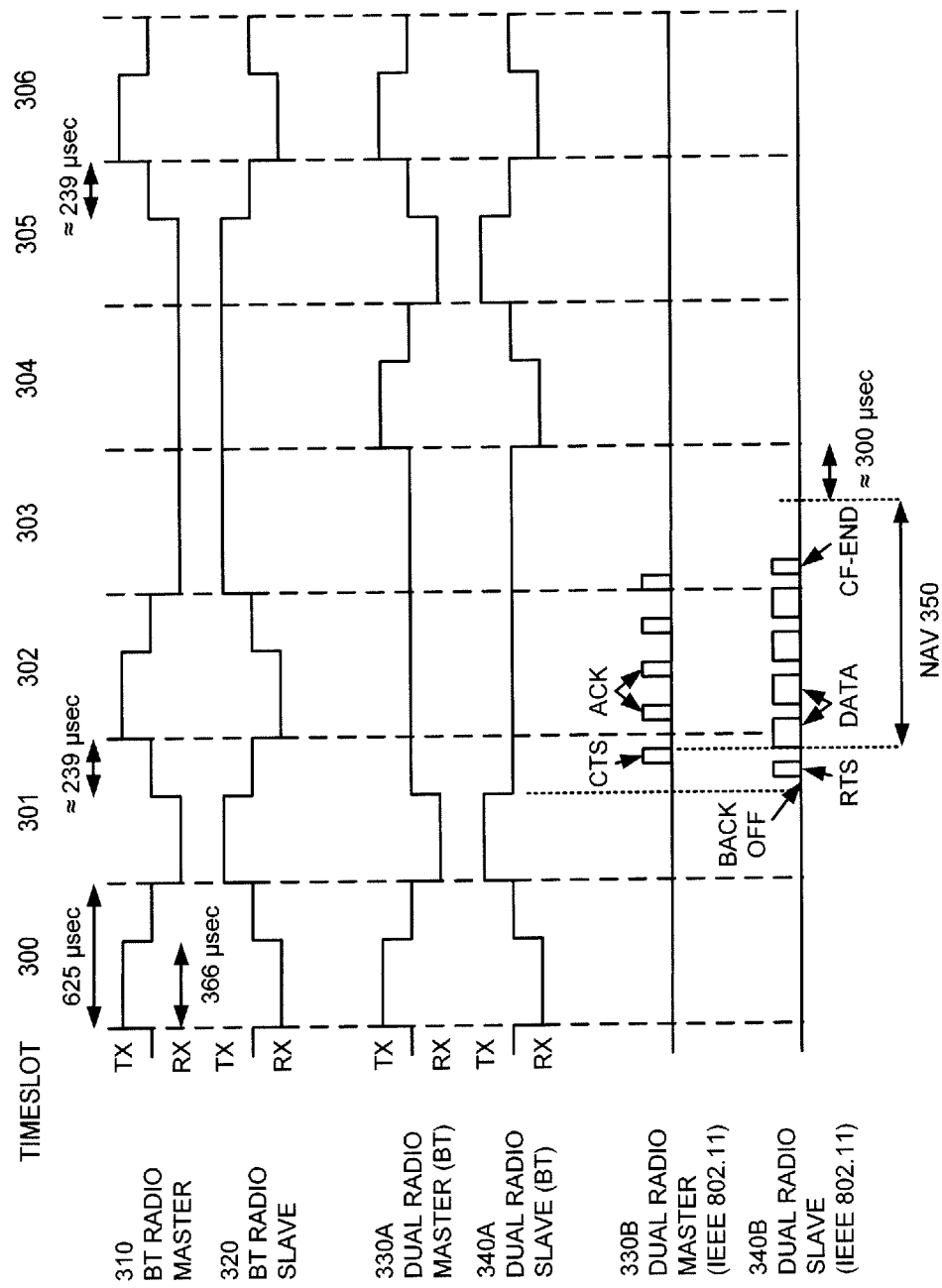
FIG. 3 illustrates Bluetooth™ transmit and receive timeslot transmissions, without and with an IEEE 802.11 WLAN transmission.

A Bluetooth™ system may consist of a master device and multiple slave devices. As illustrated in FIG. 3, a time division multiplexing communication method between a master device and a slave device may be used, where each device alternately may transmit or receive during one or more contiguous 625 μsec timeslots. Master to slave packet transmission may start in even numbered timeslots, while slave to master packet transmission may start in odd numbered timeslots. A Bluetooth™ radio master device 310 transmits to a Bluetooth™ radio slave device 320 a one timeslot wide packet during timeslots 300, 302 and 306, while the Bluetooth™ radio slave device 320 transmits to the Bluetooth™ radio master device 310 a one timeslot wide packet during timeslot 301 and a three timeslot wide packet starting in timeslot 303 and ending in timeslot 305. The waveforms in FIG. 3 for the Bluetooth™ radio master device 310 and the Bluetooth™ radio slave device 320 indicate whether the device is in transmit (TX) or receive (RX) mode during a timeslot. The Bluetooth™ radio master device 310 may control transmission by polling the Bluetooth™ radio slave device 320 periodically. Note that the Bluetooth™ radio slave device 320 may only transmit packets to the Bluetooth™ radio master device 310 in the time slots that follow reception of a master to slave packet.

The Bluetooth™ master device may communicate with multiple Bluetooth™ slave devices forming a network known as a piconet, where the master device provides a common synchronization reference clock to all slave devices in the piconet. (An exemplary piconet could include Bluetooth™ radio master device 310 and Bluetooth™ radio slave device 320.) A Bluetooth™ slave device may adjust its own clock to match the Bluetooth™ master device's reference clock within an uncertainty of ±10 μsec permitted at the beginning of each time slot to account for timing inaccuracies. As shown in FIG. 3, a single timeslot transmit or receive packet may occupy at most 366 μsec of the 625 μsec timeslot, leaving at least 625−366−10 (tx uncertainty)−10 (rx uncertainty)=239 μsec of silent period within a timeslot toward the end of a transmit or receive packet (for example near the end of timeslot 301). Similarly for a multiple slot packet, the final 239 μsec of the last time slot used by the packet may be silent as shown for timeslot 305. This silent period provides an opportunity for a second transmission method to share the bandwidth between a dual radio master device and a dual radio slave device, as described further below.

Bluetooth™ supports both synchronous and asynchronous logical transport mechanisms. One embodiment of a synchronous connection oriented (SCO) logical transport provides a symmetric point-to-point link between a master device and a specific slave device using reserved time slots and no retransmission. An extended synchronous connection oriented (eSCO) logical transport provides a symmetric or asymmetric point-to-point link using reserved time slots and a retransmission window following the reserved time slots. During silent unreserved time slots (and outside the retransmission window), a second transmission system using a second radio in a dual radio device could share the same frequency bandwidth as the Bluetooth™ radio in the dual radio device, and for established SCO and eSCO logical transports, both the dual radio master device and the dual radio slave device know which Bluetooth™ timeslots are reserved and which are unreserved, i.e. unoccupied by packet data. Transmissions by the second radio may thus avoid interference with Bluetooth™ SCO and eSCO transmissions. An asynchronous connection-oriented (ACL) logical transport using the Bluetooth™ radio, however, may also co-exist with the SCO and eSCO logical transports between the dual radio master device and a dual radio slave device, thereby potentially occupying the unreserved Bluetooth™ timeslots. Transmission by a second radio in a dual radio slave device to a dual radio master device may interfere with ACL transmissions by the Bluetooth™ radio from the dual radio master device because timeslots may occupied (and the dual radio slave device may not know that in advance). In a Bluetooth™ piconet as described above, even though a timeslot may be occupied by an ACL packet, a 239 μsec silent period that occurs after the end of an ACL slave to master packet, and before the start of the next time slot for a master to slave packet, may provide a guaranteed "quiet" unoccupied time interval.

During the silent period between the end of a Bluetooth™ slave to master packet in a timeslot and the beginning of the next timeslot for a Bluetooth™ master to slave packet, a dual radio slave device may transmit to a dual radio master device using a second radio without interfering with Bluetooth™ transmissions between the dual radio master device and other single radio Bluetooth™ (or dual radio) slave devices in a Bluetooth™ piconet. A dual radio slave device using an IEEE 802.11 physical layer radio, for example, may arbitrate with a dual radio master device during the Bluetooth™ radio's silent period to reserve a period of time for communication. FIG. 3 illustrates transmissions between a dual radio master device 330 and a dual radio slave device 340 showing the Bluetooth™ radio transmissions and the IEEE 802.11 transmissions separately for clarity. As illustrated in FIG. 3, a dual radio slave device 340 containing both a Bluetooth™ radio 340A and an IEEE 802.11 physical layer radio 340B may transmit a request to send (RTS) 802.11 packet to a dual radio master device 350 during the silent period at the end of timeslot 301, i.e. after the Bluetooth™ radio 340A in the dual radio slave device 340 transmits its packet. By sending the RTS packet, the dual radio slave device 340 may reserve access to the wireless transmission medium using the IEEE 802.11 physical layer radio. In one embodiment, and in accordance with the IEEE 802.11 protocol, the dual radio slave device 340 may wait a random length backoff period before sending the RTS packet to accommodate contention for access to the silent period by other dual radio slave devices in the piconet (i.e. the piconet including dual radio master device 330 and deual radio slave device 340.) Thus, unlike the Bluetooth™ protocol, where a Bluetooth™ radio slave device may only transmit to a Bluetooth™ radio master device in timeslots following receipt of a master to slave packet, in an embodiment of the invention, any dual radio slave device in the piconet may request to reserve access using an IEEE 802.11 physical layer radio during the silent period of the final 239 μsec following a slave to master packet.

The RTS packet may contain a duration/ID field to set a network allocation vector (NAV) 350 in all devices in the piconet (or in an overlapping IEEE 802.11 WLAN network) receiving the RTS packet indicating that the subsequent IEEE 802.11 slave to master transmission may occupy a time interval that extends from the current Bluetooth™ (slave-to-master) time slot 301 through the next Bluetooth™ (master-to-slave) time slot 302 and through most of the following Bluetooth™ (slave-to-master) time slot 303. The dual radio slave device 340 may leave sufficient time at the end of the second Bluetooth™ slave-to-master time slot 303 for another "quiet" period to allow any other dual radio slave device in the piconet to contend for access. FIG. 3 illustrates a reservation from timeslot 301 to timeslot 303 with a "quiet" period of approximately 300 μsec available at the end of timeslot 303 for a subsequent access request. Alternatively, the dual radio slave device 340 may submit a request to send packet after only a short inter-frame space (SIFS) time interval following the end of the previous transmission period, rather than leaving open a "quiet" period, thereby gaining priority over other dual radio (or single radio Bluetooth™ only) slave devices in the piconet for continued access to the medium. Note that when transmissions between the dual radio master device 330 and the dual radio slave device 340 use the IEEE 802.11 radio, transmissions using the Bluetooth™ radio may not occur. The dual radio master device 330 may not use the Bluetooth™ radio until the IEEE 802.11 radio transmissions complete, and any single radio Bluetooth™ slave devices in the piconet may only respond when polled.

A Bluetooth™ piconet that uses both a Bluetooth™ radio and an IEEE 802.11 radio may overlap with an IEEE 802.11 wireless local area network (WLAN). For example, in some embodiments the 802.11 radios in the dual radio master device 330 and the dual radio slave device 340 may be used by the dual radio devices to communicate using an IEEE 802.11 protocol in an IEEE 802.11 WLAN. The collocated overlapping IEEE 802.11 WLAN may include single radio 802.11 WLAN devices. By leaving a "quiet" period at the end of a dual radio slave to dual radio master transmission that uses an IEEE 802.11 radio, the dual radio slave devices in a piconet may permit single radio IEEE 802.11 devices in a collocated WLAN fair access to a shared frequency band.

The dual radio master device 330 may reply to the RTS packet with a clear to send (CTS) packet to grant the dual radio slave device 340 access to use the wireless transmission medium. The CTS packet may also contain a duration/ID field to set an NAV in all devices receiving the CTS packet indicating the reserved time for the subsequent IEEE 802.11 slave to master transmission. (While the RTS packet included a duration/ID field to set an NAV to ensure contention-free transmission, not all dual radio slaves may receive the RTS packet. The CTS packet transmission from the dual radio master device may reach the "hidden" dual radio slaves, thereby ensuring all dual radio slaves set an NAV appropriately.) During the granted time interval, no other dual radio slave device in the piconet may transmit, and as such the requesting dual radio slave device 340 may transmit one or more data packets to the dual radio master device 330 using an IEEE 802.11 protocol without interference. After receiving each data packet, the dual radio master device 330 may send an acknowledgement (ACK) packet to the sending dual radio slave device 340. If the dual radio slave device 340 completes sending its data before the end of the reserved time period, or if the next packet to send would extend beyond the end of the time allocated, then the dual radio slave device 340 may terminate the reserved time period by sending a contention-free end (CF-END) packet. Note that the RTS, CTS, data, ACK and CF-END packets may all be transmitted using the higher speed IEEE 802.11 WLAN physical layer radio. The dual radio master device 330 and the dual radio slave device 340 may return to transmitting packets using the Bluetooth™ radio in timeslots 304 and 305 respectively.

Figure 4:
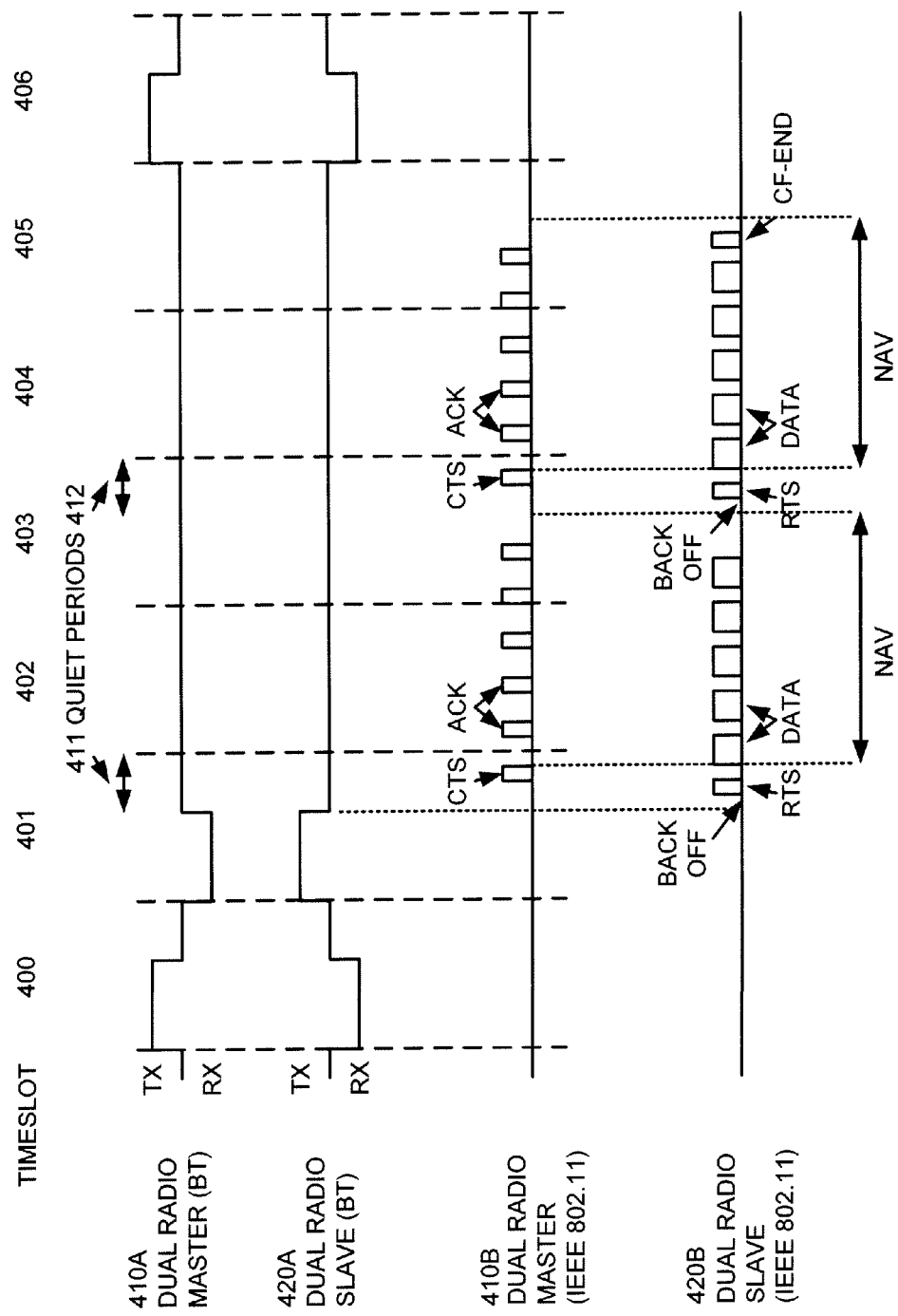
FIG. 4 illustrates two repeated IEEE 802.11 WLAN transmissions between Bluetooth™ transmissions.

In an embodiment of the invention, the RTS and CTS duration/ID fields may be chosen such that the final 300 μsec of a timeslot pair containing the IEEE 802.11 data packet may be a guaranteed silent period. As shown in timeslot 303 of FIG. 3, a new silent period of approximately 300 μsec may allow any dual radio slave device in the piconet to contend for access to the subsequent timeslot pair by sending an RTS packet to the dual radio master after a new random backoff period. FIG. 4 illustrates such back to back requests, where a dual radio slave device 420 submits a first request to a dual radio master device 410 during quiet period 411 in timeslot 401 and a second request during quiet period 412 in timeslot 403. Note that in each request, the IEEE 802.11 WLAN physical layer radio 420B in the dual radio slave device 420 backs off a random time interval before sending an RTS packet.

Figure 5:
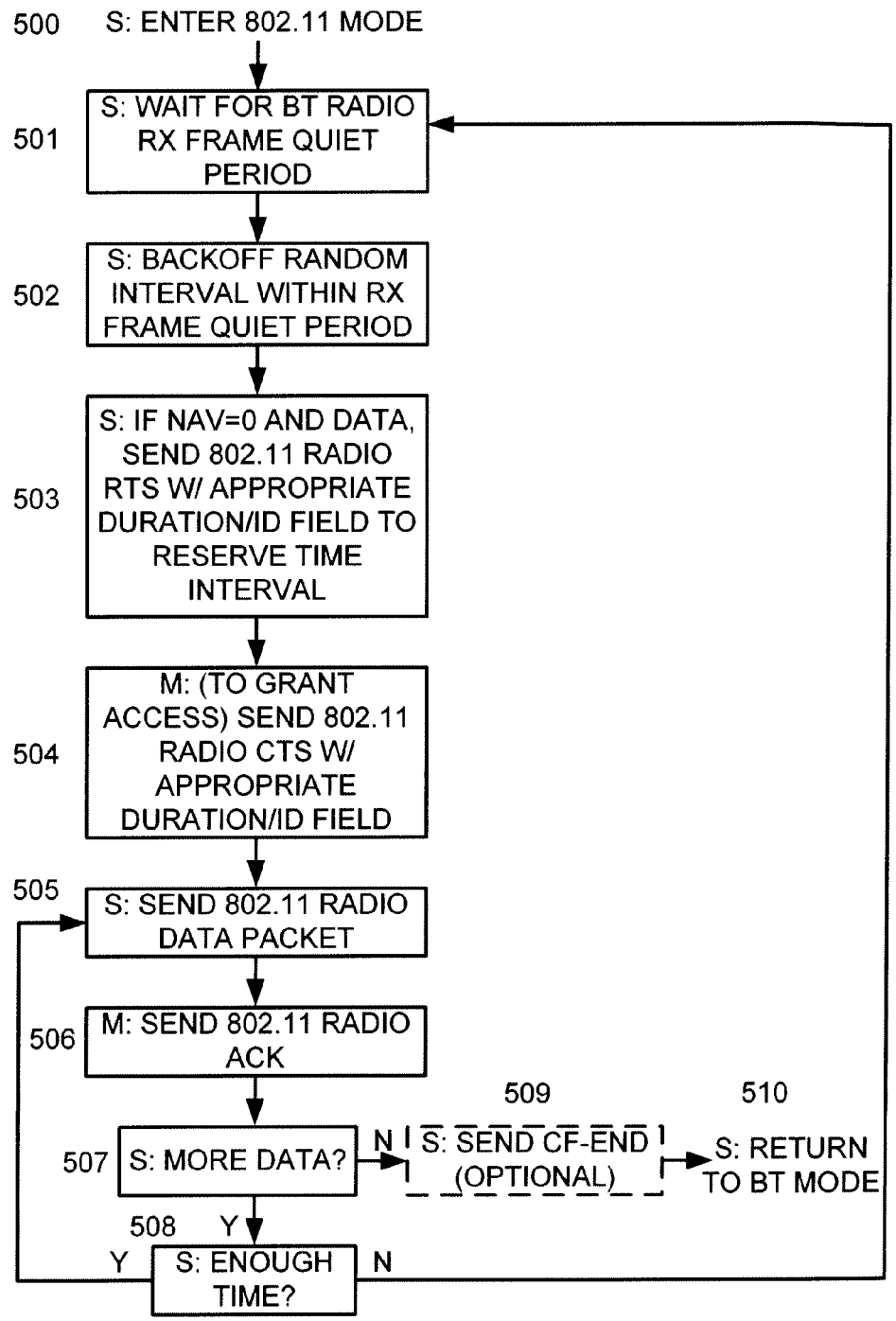
FIG. 5 illustrates a method to arbitrate communication between devices in a Bluetooth™ personal area network capable of both low and high data rate transmission.

FIG. 5 illustrates a flow chart for an embodiment of the invention, where a dual radio slave device in a piconet uses a quiet period at the end of a Bluetooth™ slave to master timeslot to send high speed data using an IEEE 802.11 physical layer radio. In step 501, the dual radio slave device waits for an appropriate quiet period, waits a random backoff period in step 502, and then sends an RTS packet to a dual radio master device using an 802.11 physical layer radio in step 503. If the dual radio master device grants access to the dual radio slave device by sending a CTS packet as indicated in step 504, the dual radio slave device transmits data packets to the dual radio master device using an IEEE 802.11 physical layer radio as indicated in step 505, with the dual radio master device acknowledging each data packet as shown in step 506. If the dual radio slave device has more data to send (step 507) and there is sufficient time available in the reserved time interval (step 508), then the dual radio slave device may send additional data. Otherwise the dual radio slave device waits for a subsequent quiet period by returning to step 501. If there is no more data to send, then the dual radio slave device may optionally terminate the reserved time period by sending a CF-END packet (step 509) and/or return to using the Bluetooth™ radio for transmissions (step 510).

In general, an embodiment of the invention may use two different wireless physical layer radios. A first physical layer radio may communicate by dividing time into a regular series of timeslots, preferably alternating between transmit and receive timeslots. If a portion of a timeslot may be known to be unoccupied by the first physical layer radio's transmit or receive data, then that portion of the timeslot may be used by a second physical layer radio to contend for access to the transmission medium without interfering with the first physical layer radio's communication. With a sufficiently long unoccupied period in the partially occupied timeslot, a pair of devices using the second physical layer radio may negotiate to occupy the remainder of the timeslot, and possibly portions of additional timeslots. Preferably, the second physical layer radio's transmissions will also leave a portion of the last timeslot in a transmission unoccupied so that devices may negotiate again for access to the transmission medium. If no device is successfully granted access to use the second physical layer radio for transmission, then the subsequent timeslot reverts to use by the first physical layer radio. Negotiation between the devices that contain the physical layer radios may use management messages to request and grant access to the transmission medium. Besides the Bluetooth™ and IEEE 802.11 protocols described above, other example communication protocols that may benefit from the invention may include the Zigbee and 802.15 wireless personal area networking (WPAN) protocols and the WiMax and 802.16 wireless metro area networking (WMAN) protocols.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A wireless communication system comprising:
   a first wireless device including a first physical layer radio conforming to a first communication protocol and a second physical layer radio conforming to a second communication protocol;
   a second wireless device including a third physical layer radio conforming to the first communication protocol and a fourth physical layer radio conforming to the second communication protocol;
   wherein the first communication protocol defines a plurality of timeslots, including a first timeslot for transmission from the second wireless device to the first wireless device using the first communication protocol, wherein the first wireless device and the second wireless device are configured to arbitrate a first communication using the second communication protocol during a silent period at an end of the first timeslot, wherein the first communication is scheduled to occur, at least in part, during a next timeslot of the plurality of timeslots, following the first timeslot.

2. The system of claim 1 wherein the first communication protocol uses a first set of frequencies, and the second communication protocol uses a second set of frequencies, and the first set of frequencies and the second set of frequencies at least partially overlap.

3. The system of claim 1 wherein the first physical layer radio is a Bluetooth™ radio and the second physical layer radio is an IEEE 802.11 radio.

4. The system of claim 1 wherein the first wireless device is a master device and the second wireless device is a slave device.

5. The system of claim 1 wherein the second wireless device may further arbitrate a second communication using the second communication protocol during silent periods of a timeslot partially occupied by a transmission using the second communication protocol.

6. The system of claim 1 wherein the second wireless device arbitrates the first communication by transmitting a first management message to reserve access to a wireless transmission medium and the first wireless device responds to the first management message with a second management message granting access to the wireless transmission medium.

7. The system of claim 6 wherein the second wireless device backs off a random time period following the end of the transmission using the third physical layer radio conforming to the first communication protocol before transmitting the first management message using the fourth physical layer radio conforming to the second communication protocol.

8. The system of claim 6 wherein the first management message includes a network allocation vector to reserve the wireless transmission medium for one or more timeslots.

9. The system of claim 8 wherein the second wireless device releases reservation of the wireless transmission medium by sending a third management message.

10. The system of claim 6 wherein the first management message is a request to send packet and the second management message is a clear to send packet.

11. The system of claim 7 wherein the first management message is a request to send packet.

12. The system of claim 8 wherein the first management message is a request to send packet.

13. The system of claim 9 wherein the third management message is a contention-free end packet.

14. A wireless communication method comprising:
    sending a first communication between a first wireless device and a second wireless device using a first communication protocol that defines a plurality of timeslots, including a first timeslot for transmission from the second wireless device to the first wireless device using the first communication protocol; and
    arbitrating a second communication between the first wireless device and the second wireless device using a second communication protocol during a silent period at an end of the first timeslot, wherein the second communication is scheduled to occur, at least in part, during a next timeslot of the plurality of timeslots, following the first timeslot.

15. The method of claim 14 wherein the first communication protocol uses a first set of frequencies and the second communication protocol uses a second set of frequencies, and the first set of frequencies and the second set of frequencies at least partially overlap.

16. The method of claim 14 wherein the first communication protocol is a Bluetooth™ protocol and the second communication protocol is an IEEE 802.11 protocol.

17. The method of claim 14 wherein the first wireless device is a master device and the second wireless device is a slave device.

18. The method of claim 14 further comprising
    arbitrating a third communication using the second communication protocol during silent periods of a timeslot partially occupied by the second communication.

19. The method of claim 14 wherein arbitrating the second communication includes the second wireless device transmitting a first management message to reserve access to a wireless transmission medium and the first wireless device responding to the first management message with a second management message granting access to the wireless transmission medium.

20. The method of claim 19 further comprising the second wireless device backing off a random time period following the end of the first communication using the first communication protocol before transmitting the first management message using the second communication protocol.

21. The method of claim 19 wherein the first management message includes a network allocation vector to reserve the wireless transmission medium for one or more timeslots.

22. The method of claim 21 further comprising the second wireless device releasing reservation of the wireless transmission medium by sending a third management message.

23. The method of claim 19 wherein the first management message is a request to send packet and the second management message is a clear to send packet.

24. The method of claim 20 wherein the first management message is a request to send packet.

25. The method of claim 22 wherein the third management message is a contention-free end packet.

* * * * *